Figure 1:
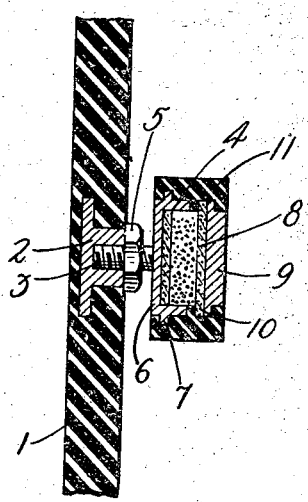

C. R. MOORE.
DEVICE FOR CONVERTING SOUND OR OTHER VIBRATIONS INTO VARIATIONS IN AN ELECTRICAL CIRCUIT.
APPLICATION FILED MAY 18, 1918.

1,375,465. Patented Apr. 19, 1921.

Inventor:
Charles R. Moore.
by J.E. Roberts Atty

UNITED STATES PATENT OFFICE.

CHARLES R. MOORE, OF EAST ORANGE, NEW JERSEY, ASSIGNOR TO WESTERN ELECTRIC COMPANY, INCORPORATED, OF NEW YORK, N. Y., A CORPORATION OF NEW YORK.

DEVICE FOR CONVERTING SOUND OR OTHER VIBRATIONS INTO VARIATIONS IN AN ELECTRICAL CIRCUIT.

1,375,465.  Specification of Letters Patent.  Patented Apr. 19, 1921.

Application filed May 18, 1918. Serial No. 235,417.

*To all whom it may concern:*

Be it known that I, CHARLES R. MOORE, a citizen of the United States, residing at East Orange, in the county of Essex and State of New Jersey, have invented certain new and useful Improvements in Devices for Converting Sound or other Vibrations Into Variations in an Electrical Circuit, of which the following is a full, clear, concise, and exact description.

This invention relates to a device for converting sound or other vibrations into variations in an electrical circuit, and more particularly to a device which is especially adapted to be used for the purpose of indicating the presence and character of vibrations of sound propagated from a distant point either through air or through water.

The device is adapted to be secured to a sound-receiving body such as the side of a ship, a mine casing, or a diaphragm to reproduce vibrations set up in such sound-receiving body in an electrical circuit including an ordinary telephone receiver.

It is an object of this invention to provide a device of this character which, while very sensitive, will convert the sound or other vibrations which it is desired to detect into variations in an electrical circuit without substantial distortion. It is particularly an object of the invention to prevent distortion of vibrations of a frequency in the neighborhood of the natural frequency of the moving system of the device due to resonance.

It is also an object of this invention to provide a device of this character which may be used in exposed and particularly damp places without deterioration, and to provide a device which is relatively insensitive to variations of local origin.

The device of the invention takes the form of a member which may be secured in fixed relation to a sound-receiving body and a second member also supported from said sound-receiving body but capable of movement relative thereto, the inertia of said second member serving to cause relative movement between the two members in response to vibrations of the sound-receiving body upon which the device is mounted. The relative movement between the two members may be utilized either to vary the resistance of the electrical circuit, as in the well-known microphone, or to vary the inductance or capacity of such circuit.

In accordance with a feature of the invention, distortion is prevented by supporting the relatively movable member by means of an energy-absorbing material which serves to damp such relative movement, this material being of such a character as to render it resistant to moisture.

In accordance with another feature of the invention, the supporting means is arranged so that it yields readily along a line perpendicular to the plane of the sound-receiving body upon which it is mounted and possesses considerable stiffness against movement along a line parallel to such plane. In accordance with this feature of the invention, a metal insert or stiffener is included in the yielding supporting means to stiffen such supporting means against flexure without impairing its resiliency with reference to compression and extension.

In the embodiment of the invention disclosed herein the device takes the form of a microphone, and more particularly of a microphone of the carbon granule type. The device is provided with two electrodes between which is included a mass of granular carbon, such electrodes forming a part of an electrical circuit. The entire device is supported from one electrode and the other electrode is supported from the first electrode by means of a member of resilient waterproof material such as rubber which has high energy-absorbing characteristics and which permits relative movement between the electrodes.

Figure 2:
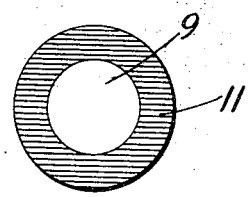

In the accompanying drawings Figure 1 represents a transverse section of a sound-receiving body and the device of the invention supported thereon; Fig. 2 is a rear elevation of the device.

Referring to the drawing, a sound-receiving body is indicated at 1. As shown, it consists of a rubber diaphragm which is adapted to be suitably supported in a situation to receive or to be actuated by sound waves impinging thereon. The side of a ship or the walls of a mine casing or other submerged object may be utilized as the sound-receiving body, particularly when the device is used for the purpose of detecting the presence of a vessel of the submarine type. Embedded in the sound-receiving body is a bushing indicated at 2, which is internally threaded to receive a stem 3 which is secured to the electrode 4. The stem 3 is adapted to be locked in the bushing by means of a nut 5 which is threaded thereon. Also carried on the stem 3 and surrounding an electrode 4 is a metal cup member 6 which is provided with a circumferential ridge 7. The electrode 4, since it is mounted in fixed relation with the sound-receiving body and is incapable of movement relative thereto, will be referred to for convenience as the fixed electrode. A second electrode 8 is secured to a disk member 9 of metal forming a disk structure having considerable inertia. This member is also provided with a circumferential ridge 10 which is formed by the periphery of the electrode and a projection of the member 9. A ring member 11 of comparatively soft rubber is provided with grooves which are adapted to engage the ridges 7 and 10, so that when the ring is in position it serves as the sole support for the electrode 8 and the member 9. The two electrodes, when assembled within the rubber ring, provide in connection with such ring, a carbon chamber which is filled with a mass of carbon granules. The electrodes themselves may be of any suitable construction, although they are preferably formed of carbon. In order to prevent short-circuiting the path through the granular carbon, the inner surface of the cup member 6 may be provided with a coating of insulating material. The metal cup member 6 is provided with longitudinal walls of considerable extent, which walls serve to reinforce the rubber ring 11 and thus to stiffen the rubber ring against movement parallel to the sound-receiving body.

When the device is mounted on the side of a vessel or on some other sound-receiving body, the vibrations in such sound-receiving body cause the device as a whole to vibrate. Due, however, to the inertia of the member 8, 9 and the yielding mounting of such member by means of the rubber ring 11, vibration of the sound-receiving body will set up corresponding relative movement between the electrodes 4 and 8. This movement varies the resistance of the carbon granules and consequently the resistance of the electric circuit including such carbon granules. Inasmuch as the rubber supporting ring is of energy-absorbing material, while permitting the relative movement between the electrodes 4 and 8, it will serve to damp such movement and prevent undue distortion of the impulses produced in the electrical circuit, which would occur when the system was vibrated near its natural frequency if no damping means were provided.

When the device is to be used in a special situation, particularly in a damp place, it is desirable to exclude dampness from the carbon chamber, and this function is also performed by the rubber ring 11, which in addition to being of energy-absorbing material, is also moistureproof. When the device is mounted upon a floating object and more particularly on the side of a vessel, it is subject to a considerable vibration of local origin, due either to wave motion or to vibration of the vessel, due to the motive power of such vessel. These vibrations, however, are in general in a direction parallel with the sound-receiving body, or in a direction at right angles or transverse to the direction of sound vibrations which impinge upon such sound-receiving body. Unless these vibrations of local origin are compensated for, noise is introduced in the telephone receiver, due to movement of the electrodes parallel with the sound-receiving body.

It is apparent that in the construction described and illustrated on the drawing that the cup member 6 serves to restrain the yielding annulus 11 against flexure. In devices of the character described, where an inertia element is supported by means of a yielding support from a sound responsive body at the movement of the device the line with the vibration responsive body will have a tendency to flex or bend the yielding support. The situation is somewhat analogous to the weight on the end of a spiral spring. In accordance with the present invention, however, this tendency to flex or bend is counteracted by means of the side walls of the member 6 by virtue of which any motion between the inertia member 9 and the front electrode 4, parallel to each other, is restrained to a material extent, the only motion of this character possible being due to a slight yield in a transverse direction of a very small length of the tubular portion 11.

What is claimed is:

1. In a device of the inertia type for translating vibrations into impulses in an electrical circuit, a pair of electrodes, energy-absorbing material holding said electrodes in spaced relation, and means to reinforce internally said energy-absorbing material against flexure.

2. In a device for translating vibrations into impulses in an electrical circuit comprising a chamber having walls of yielding material provided with interior grooves, electrodes held in spaced relation within said grooves by the elasticity of the walls, and variable resistance material included between said electrodes.

3. A microphone comprising a receptacle having yielding side walls, a pair of electrodes supported from said side walls in spaced relation, variable resistance material included between said electrodes, and means for stiffening said side walls against flexure.

4. A microphone comprising a metal cup, an electrode mounted within said cup, an external ridge on said cup, an inertia member of considerable mass, a second electrode carried by said inertia member, a supporting member of yielding energy absorbing material engaging said ridge for supporting said member on said cup, and a variable resistance included between said electrodes.

In witness whereof, I hereunto subscribe my name this 13th day of May, A. D. 1918.

CHAS. R. MOORE.